US005977470A

United States Patent [19]

Suda

[11] Patent Number: 5,977,470

[45] Date of Patent: Nov. 2, 1999

[54] ELECTRONIC MUSICAL INSTRUMENT WITH INDEPENDENT CONTROL OF EXPRESSION AND EFFECT

[75] Inventor: Masayuki Suda, Hamamatsu, Japan

[73] Assignee: Kabushiki Kaisha Kawai Gakki Seisakusho, Shizuoka-ken, Japan

[21] Appl. No.: 09/089,089

[22] Filed: Jun. 2, 1998

[30] Foreign Application Priority Data

Jun. 4, 1997 [JP] Japan .................................... 9-161975
Jul. 10, 1997 [JP] Japan .................................... 9-200905

[51] Int. Cl.$^6$ ................................ G01H 1/02; G01H 7/00

[52] U.S. Cl. ................................ 84/630; 84/633; 84/665

[58] Field of Search .............................. 84/630, 633, 665

[56] References Cited

U.S. PATENT DOCUMENTS 4,947,723 8/1990 Kawashima et al. ................. 84/630 X
5,406,023 4/1995 Nagahama ............................ 84/630 X
5,744,739 4/1998 Jenkins ................................. 84/661 X
5,789,689 8/1998 Doidic et al. .
5,804,751 9/1998 Koseki et al. ........................ 84/630 X

*Primary Examiner*—Jeffrey W. Donels

[57] ABSTRACT

An electronic musical instrument has a processing circuit for adding a reverberation tone after volume control using expression data generated upon operation of an expression pedal to generate tone data which does not vary the attenuation characteristics of the reverberation tone by operation of the expression pedal. The volume control and reverberation tone addition are implemented by a digital signal processor. Auditory sense correction of the volume control is also done by exponentially transforming expression data.

28 Claims, 8 Drawing Sheets

ELECTRONIC MUSICAL INSTRUMENT WITH INDEPENDENT CONTROL OF EXPRESSION AND EFFECT

BACKGROUND OF THE INVENTION

1. Field of the Invention

The present invention relates to an electronic musical instrument and, more particularly, to a technique suitably used in an electronic musical instrument comprising an effect adder that adds acoustic effects such as a reverberation tone or the like to the input tone signal.

2. Description of the Prior Art

Conventionally, in an electronic musical instrument such as an electronic organ, addition of acoustic effects such as reverberation, and the like can give profoundness and depth to tones like in acoustic musical instruments, and such effects are important factors in colorful musical expressions. For this purpose, in most of conventional electronic musical instruments, for example, a microprocessor (CPU) controls the operation of an effect adder to add acoustic effects.

Such electronic organ or the like normally comprises an expression pedal that accentuates tones by controlling the overall volume. Furthermore, the electronic organ comprises a MIDI terminal for receiving an external MIDI signal to play, and a sequencer for performing an auto-play in accordance with a predetermined sequence pattern. The volume is controlled along with the progress of a music piece in accordance with such data.

FIG. 9 shows an example of the arrangement of a conventional electronic musical instrument comprising a reverberation device, expression pedal, and the like. As shown in FIG. 9, a reverberation device 2 comprises a DSP (digital signal processor) 1, and makes predetermined calculations of a digital tone signal input from a tone generator 10 using various coefficients, thereby adding a reverberation effect.

The tone signal added with the reverberation effect by the reverberation device 2 is mixed by an adder 3 with the tone signal to which the reverberation is not effected. The mixed signal is supplied to a D/A converter 15. The tone signal is converted into an analog signal by the converter 15. The analog tone signal is supplied to a loudspeaker 18 via a VCA (Voltage Controlled Amplifier) 19, master volume 16, and amplifier 17, thus producing actual tones.

The VCA 19 controls the overall volume (accent) on the basis of the operation of an expression pedal (to be referred to as an EXP pedal hereinafter) 7, a MIDI signal input from an external device (not shown) to a MIDI terminal 13, or a sequence pattern supplied from a sequencer 14.

For example, data of the operation amount (to be referred to as EXP data hereinafter) of the EXP pedal 7, which has been A/D-converted by an A/D converter 8, is temporarily supplied to a CPU 9. The EXP data is converted into an analog signal by a D/A converter 20, and the analog signal is supplied to the VCA 19. The VCA 19 controls the volume of an analog tone signal supplied from the D/A converter 15 in accordance with the signal corresponding to the operation amount of the EXP pedal 7 and supplied from the D/A converter 20, and outputs the controlled signal.

The MIDI signal or sequence pattern includes data corresponding to the EXP data, and such data is supplied to the D/A converter 20 as in the above-mentioned case. The EXP data converted into an analog signal is supplied to the VCA 19. The VCA 19 controls the volume of an analog tone signal supplied from the D/A converter 15 in accordance with the signal supplied from the D/A converter 20, and outputs the controlled signal to the next stage.

However, in the conventional electronic musical instrument, the reverberation tone added by the reverberation device 2 is influenced by changes in volume based on the EXP data from the EXP pedal 7, MIDI terminal 13, or sequencer 14, resulting in unnatural attenuation characteristics. This problem will be explained below with reference to FIG. 2.

(a) of FIG. 2 shows changes in operation amount data of the EXP pedal 7, i.e., the state wherein the EXP pedal 7 begins to be released from the pressed state at time A, is fully released at time B, begins to be pressed again from time C, and is fully pressed at time D. (b) of FIG. 2 shows a tone signal to which reverberation is not effected. (c) of FIG. 2 shows a tone signal added with the reverberation effect.

As shown in (b) of FIG. 2, when the EXP pedal 7 has been fully pressed, a tone signal (to be referred to as an original tone hereinafter) output from the tone generator 10 is directly output from the VCA 19 to the master volume 16, as denoted by reference numeral 21. On the other hand, when the EXP pedal 7 is fully released, the volume of the tone signal is suppressed by the VCA 19, and that signal is output, as denoted by reference numeral 22.

The volume control using the EXP pedal 7 is done for not only the original tone but also the reverberation tone. More specifically, as shown in (c) of FIG. 2, when the EXP pedal 7 has been fully pressed, the reverberation tone added to the original tone is directly output without suppressing its volume, as denoted by reference numeral 23. On the other hand, when the EXP pedal 7 is gradually released, the volume of the reverberation tone added to the original tone is suppressed according to the operation amount of the EXP pedal 7, and the suppressed tone is output.

For example, when the EXP pedal 7 is gradually released from time A to time B, the volume of the reverberation tone is suppressed during this interval, as denoted by reference numeral 24. As can be seen from (c) of FIG. 2, when the EXP pedal 7 is released while the reverberation tone is being added, the reverberation tone converges quicker than that obtained by pressing the EXP pedal 7, resulting in an unnatural tone.

When the EXP pedal 7 is pressed from time C to time D, the volume of the reverberation tone, that has been suppressed by the VCA 19 before pressing, is not suppressed after pressing. That is, after the EXP pedal 7 is pressed, the reverberation tone (the same as that denoted by reference numeral 23) added to the original tone is output without suppressing its volume, as denoted by reference numeral 25. This is no longer a reverberation tone but is a very unnatural tone that never occurs in natural environments.

As described above, in the conventional electronic musical instrument, when the operation amount of the EXP pedal is changed during addition of the reverberation effect, the reverberation tone added by the reverberation device 2 is influenced by changes in volume by the EXP pedal 7, thus outputting a very unnatural tone. The same applies to plays based on a MIDI signal or sequence pattern. That is, the reverberation tone should have a given attenuation constant that simulates the play sound field, but is unnaturally influenced by the operation of the EXP pedal.

SUMMARY OF THE INVENTION

The present invention has been made to solve the above-mentioned problems, and has as its object to always obtain a natural reverberation effect without any influences on the attenuation characteristics of the added reverberation tone, when accents of tones are controlled on the basis of the operation of the EXP pedal, MIDI signal, sequence pattern, or the like.

According to the present invention, an electronic musical instrument which comprises an effect adder for adding an acoustic effect to an input tone signal, is characterized in that a volume control for controlling volume on the basis of expression data is inserted before the effect adder.

Note that the expression data may be either operation amount data of an expression pedal, or data included in an externally input MIDI signal or a sequence pattern. Also, the volume control may comprise a digital signal processor.

According to another feature of the present invention, the electronic musical instrument further comprises a smoother for smoothing variation points of the expression data which are input intermittently.

Note that the a smoother may comprise either an interpolator for linearly interpolating the expression data or an LPF. Alternatively, the smoother may comprise both.

Furthermore, the interpolator may comprise resampler for resampling the expression data, which are intermittently input at indefinite intervals, at given time intervals to obtain normalized expression data, and a linear interpolator for performing linear interpolation to a target value which is a value of a predetermined ratio between current and next sampling point values obtained by the resampler.

According to still another feature of the present invention, an electronic musical instrument comprises a volume control for controlling an accent of a tone by controlling an amplitude of tone data in accordance with expression data which changes along with the progress of a music piece, and a reverberator for adding a reverberation tone signal having predetermined attenuation characteristics to an output from the volume control.

DESCRIPTION OF THE PREFERRED EMBODIMENTS

An embodiment of the present invention will be described hereinafter with reference to the accompanying drawings.

Figure 1:
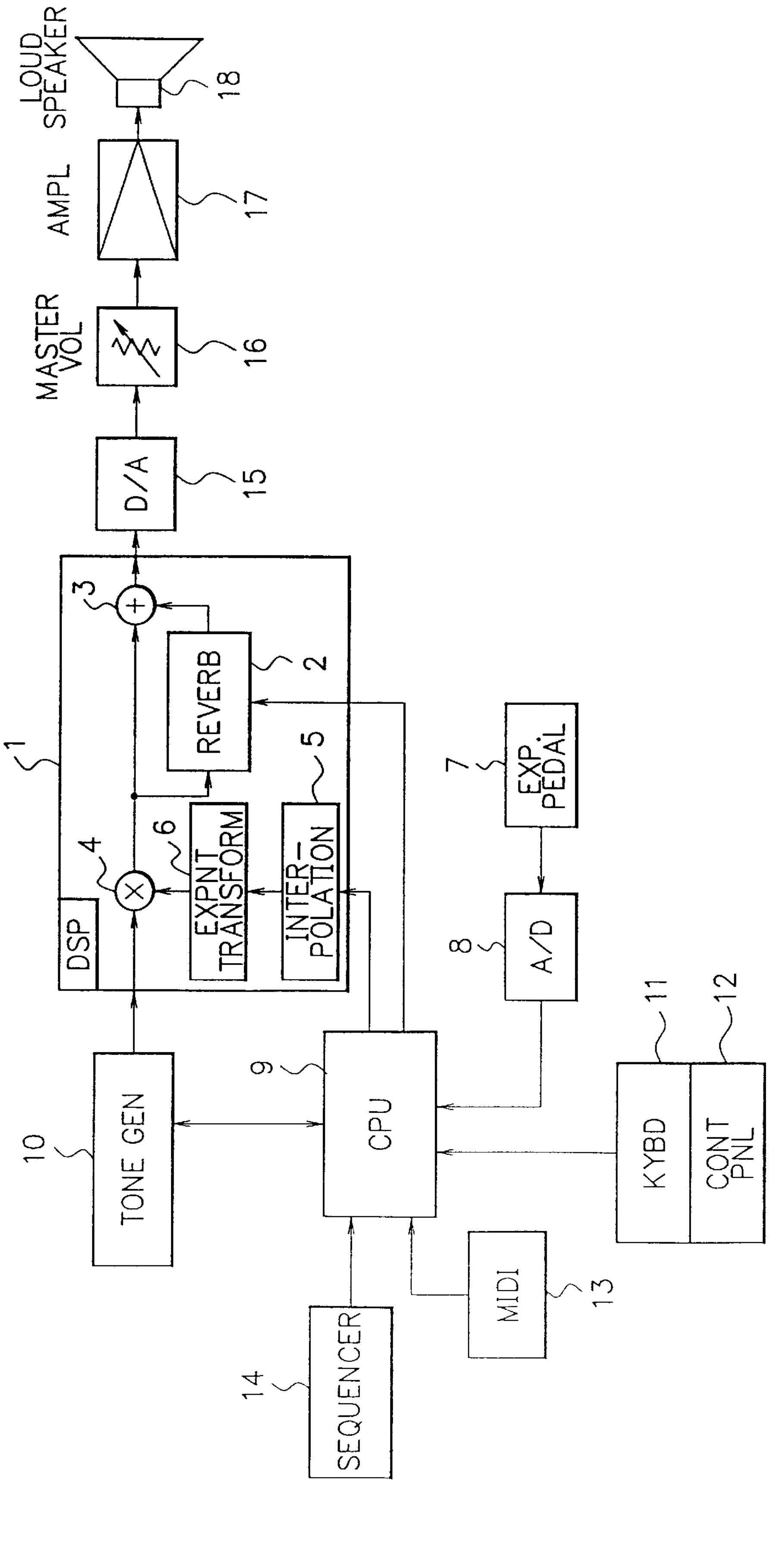
FIG. 1 is a block diagram showing the arrangement of an electronic musical instrument according to an embodiment of the present invention.
Figure 9:
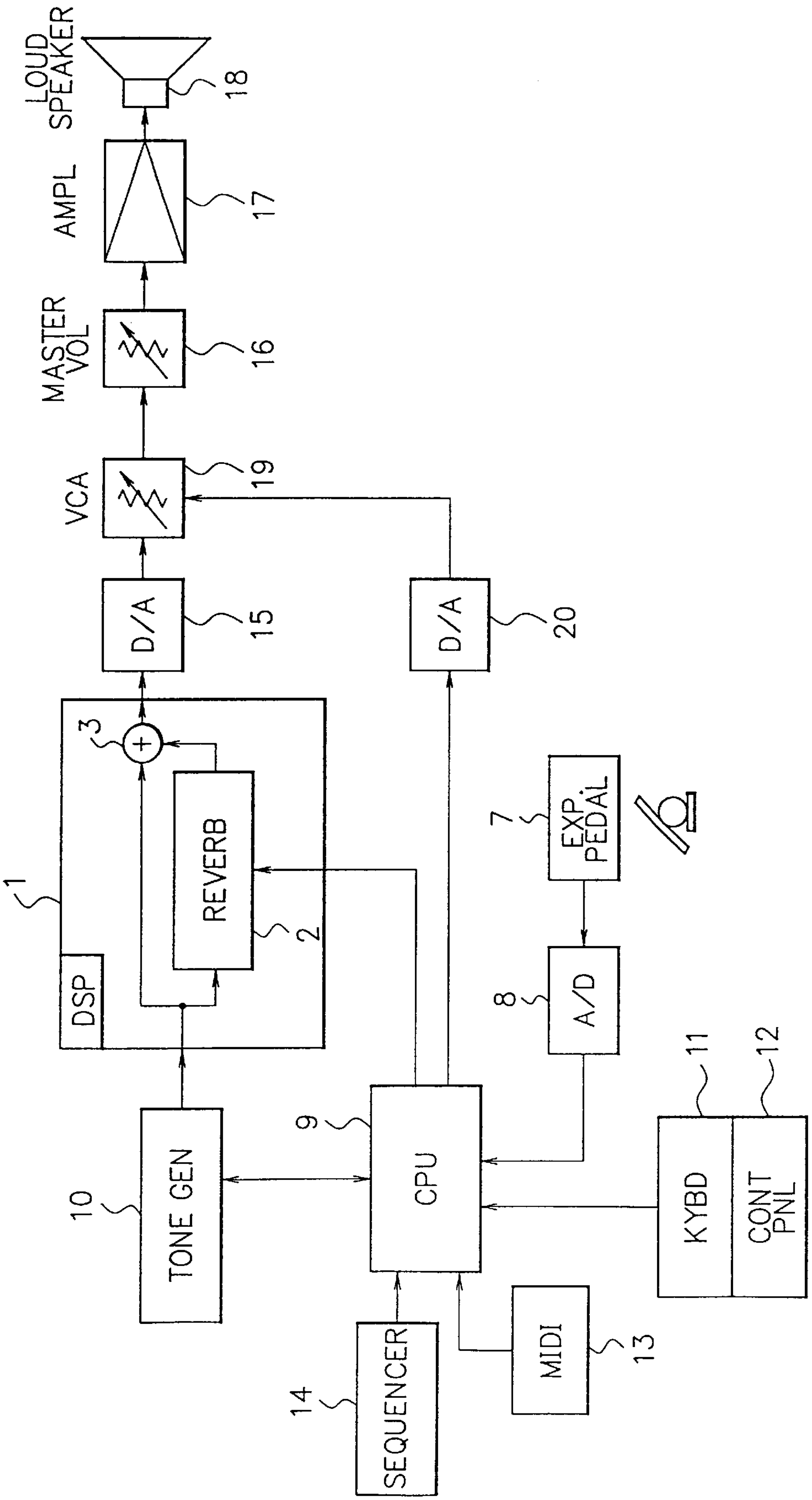
FIG. 9 PRIOR ART
FIG. 9 is a block diagram showing an example of the arrangement of a conventional electronic musical instrument.

FIG. 1 is a block diagram showing the arrangement of an electronic musical instrument according to this embodiment, and the same reference numerals in FIG. 1 denote the same blocks as those in the conventional electronic musical instrument shown in FIG. 9. The characteristic feature of this embodiment is that a volume controller responsive to EXP data is inserted before a reverberation device 2.

More specifically, as shown in FIG. 1, a multiplier 4 serving as a volume controller using EXP data is inserted before the reverberation device 2. The multiplier 4 comprises a DSP 1, and digitally controls volume in place of the conventional analog volume using the VCA 19 shown in FIG. 9.

More specifically, in this embodiment, EXP data supplied from an EXP pedal 7 to a CPU 9 via an A/D converter 8 is supplied to the multiplier 4 via an interpolator 5 and an exponential transformer 6. The multiplier 4 multiplies a digital tone signal output from a tone generator 10 by the EXP data to control volume, and supplies the volume-controlled tone signal to the reverberation device.

With this arrangement, the volume control using the EXP pedal 7 is done for only an original tone output from the tone generator 10, but not for any reverberation tone. The reverberation device 2 always adds the reverberation effect to the tone signal, the volume of which has been controlled based on the EXP pedal 7.

Figure 2:
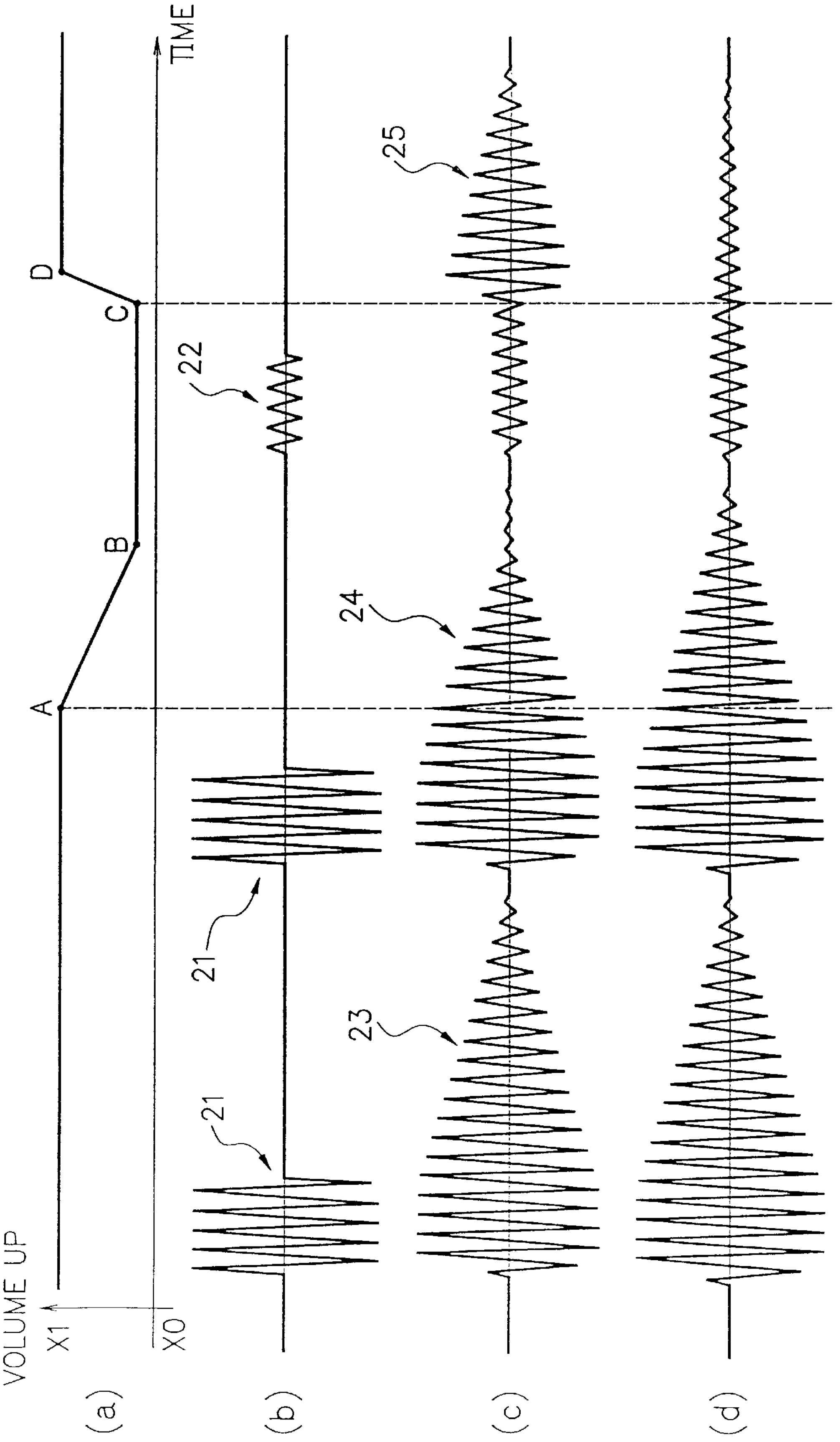
FIG. 2 is a waveform chart showing the results of volume control on the basis of the operation of an EXP pedal.

With this control, even when the EXP pedal 7 is pressed from time C to time D during addition of the reverberation effect, the reverberation effect is added to the already volume-controlled tone signal denoted by reference numeral 22, and is not influenced by changes in volume by the EXP pedal 7, thus obtaining a natural reverberation tone, as shown in (d) of FIG. 2.

Note that the reverberation device 2 adds the reverberation effect on the basis of control signals and the like supplied from the CPU 9. The control signals supplied from the CPU 9 include a mode control signal that changes the depth of reverberation like in a hall mode, room mode, and the like. Such mode is selected at a control panel 12.

In this embodiment, the volume does not undergo analog control by simply inserting the conventional VCA 19 before the reverberation device 2 but is digitally controlled by the DSP 1. In this embodiment, since the volume is controlled before the reverberation effect is added, analog residual noise that may be unwantedly included in the reverberation tone by analog processing can be prevented by the digital processing.

As will be described later, when EXP data changes abruptly, tones are discontinuously produced, and this disturbs natural flow of the music. For this reason, the EXP data is preferably changed not so abruptly. Meanwhile, since the volume control based on the EXP data is frequently done in a single music piece unlike the volume control by the master volume 16, the EXP data preferably has good followability for changes. For this reason, this embodiment performs digital processing that meets both the requirements, i.e., smooth changes in EXP data and good followability of EXP data for changes.

More specifically, the EXP data is intermittently output from the CPU 9 to the DSP 1. This is because the CPU 9 time-divisionally executes various kinds of control of the reverberation device 2, the EXP pedal 7, the tone generator 10, a keyboard 11, the control panel 12, a MIDI terminal 13, and a sequencer 14, and preferentially controls the tone generator 10, keyboard 11, and the like, which are particularly important for tone generation, among these devices, but checks the operation amount of the EXP pedal 7 only at predetermined time intervals. When the operation amount of the EXP pedal 7 is A/D-converted by the A/D converter 8, noise may be superposed on the converted digital signal. In order to exclude such noise component, the CPU 9 outputs EXP data to the DSP 1 only when the EXP data has been changed from the previous EXP data by a predetermined amount or more.

Figure 3:
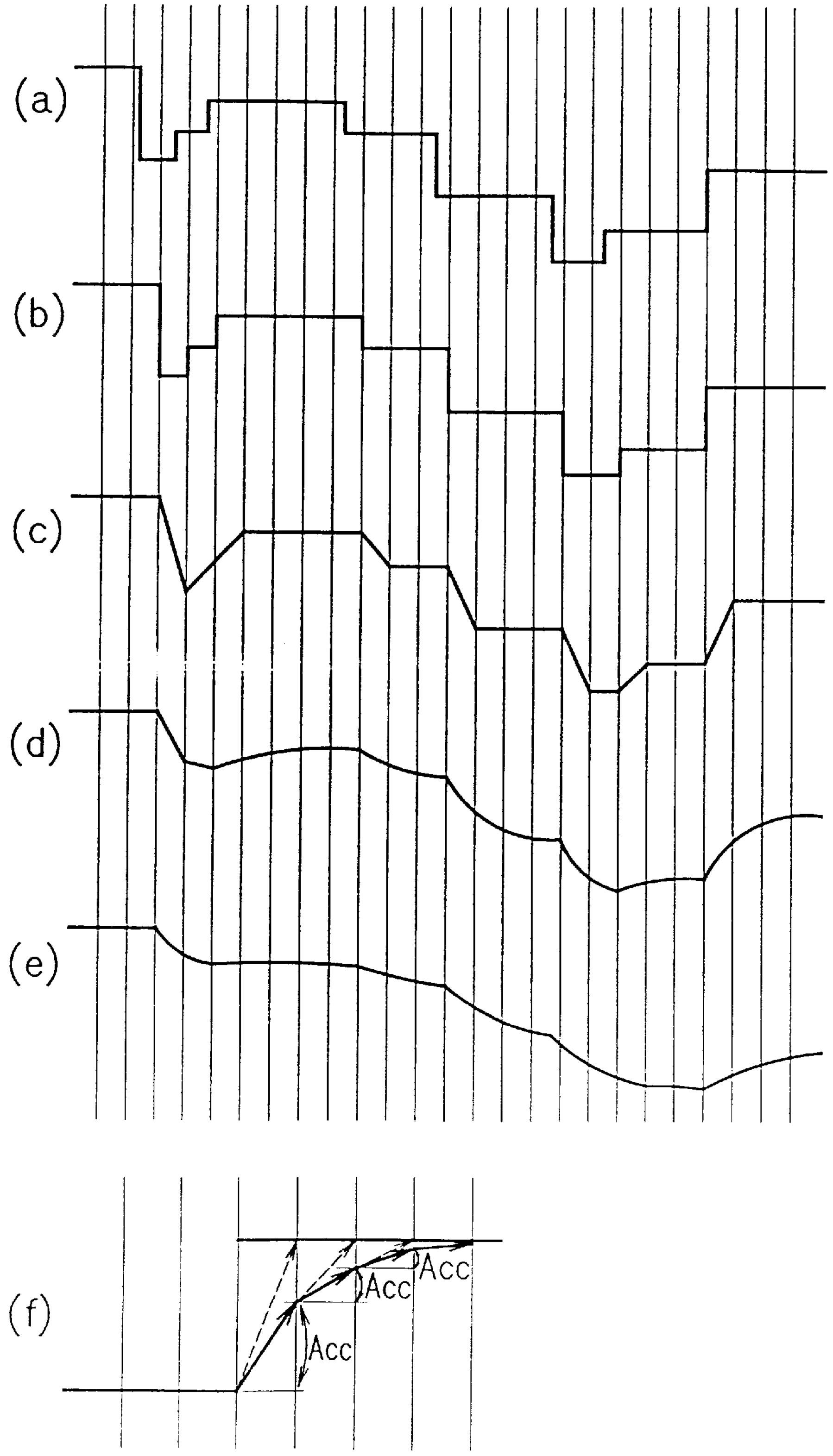
FIG. 3 is a chart for explaining the operation of an interpolator of the embodiment shown in FIG. 1.

As a result of such control, the EXP data intermittently changes in a staircase pattern, as shown in (a) of FIG. 3. However, when such EXP data is multiplied in this state by a tone signal output from the tone generator 10, noise is produced each time the EXP data has changed. That is, when the EXP data has changed abruptly, the volume of the tone signal before addition of reverberation changes abruptly, and a discontinuous point is produced there, resulting in noise. In order to prevent such noise from being produced, the interpolator 5 is provided to smoothly change the EXP data.

FIG. 3 is a chart for explaining the operation of the interpolator 5. More specifically, the interpolator 5 samples EXP data intermittently supplied from the CPU 9. As described above, since EXP data is non-periodically supplied from the CPU 9, as shown in (a) of FIG. 3, the interpolator 5 samples such data at given time intervals to obtain normalized EXP data, as shown in (b) of FIG. 3. Note that the vertical lines in FIG. 3 indicate the sampling points.

Subsequently, the interpolator 5 obtains linearly interpolated EXP data by linearly interpolating data from the current sampling point to the next sampling point using the normalized EXP data. At this time, as shown in (f) of FIG. 3, linear interpolation is done by multiplying the difference from the next sampling point value by a coefficient Acc, so as to obtain the internally divided value of Acc % between the current and next sampling point values as a target value for linear interpolation. (c), (d), and (e) of FIG. 3 show the interpolation states when the coefficient Acc is respectively set at 100%, 50%, and 25%.

As can be seen from FIG. 3, as the coefficient Acc assumes a smaller value, changes in EXP data are averaged, and become smoother, but the followability of EXP data for changes is worsened. By contrast, as the coefficient Acc assumes a larger value, the followability of EXP data for changes is improved, but some abrupt change portions appear. Hence, the coefficient Acc is preferably set at a value that can satisfy both requirements, i.e., smooth changes in EXP data, and good followability for changes. In practice, the coefficient Acc is determined in consideration of the resampling time, the maximum change rate of EXP data, and the like.

Figure 4:
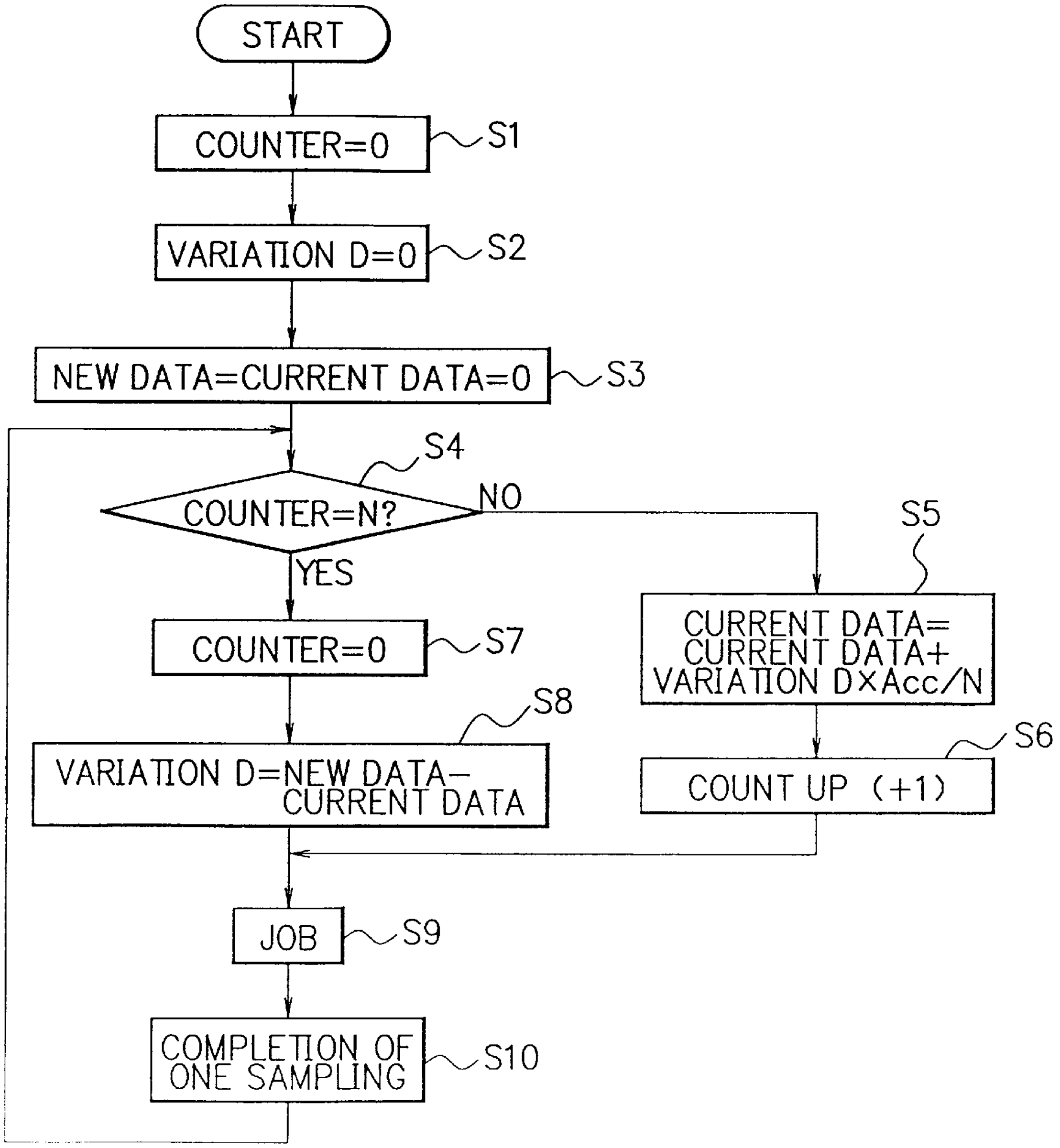
FIG. 4 is a flow chart showing a series of processing operations done by a DSP.

FIG. 4 is a flow chart showing a series of processing operations done by the DSP 1. In FIG. 4, initialization is made in steps S1 to S3. More specifically, in step S1, a counter for measuring the interval between neighboring sampling points (the time interval between neighboring vertical lines shown in FIG. 3) for resampling is initialized to zero. This counter is reset to zero when it has counted N (e.g., N=128).

In step S2, a variation D as the difference between the current data (an EXP data value at the current sampling point) and new data (an EXP data value at the next sampling point) is initialized to zero. Also, in step S3, the values of both the current and new data are initialized to zero. After such initialization, the flow advances to step S4 to check if the value of the counter has reached N. If the value of the counter is N, the flow advances to step S7; otherwise, the flow advances to step S5. However, initially, since the counter value has been initialized to zero, the flow advances to step S5.

Figure 5:
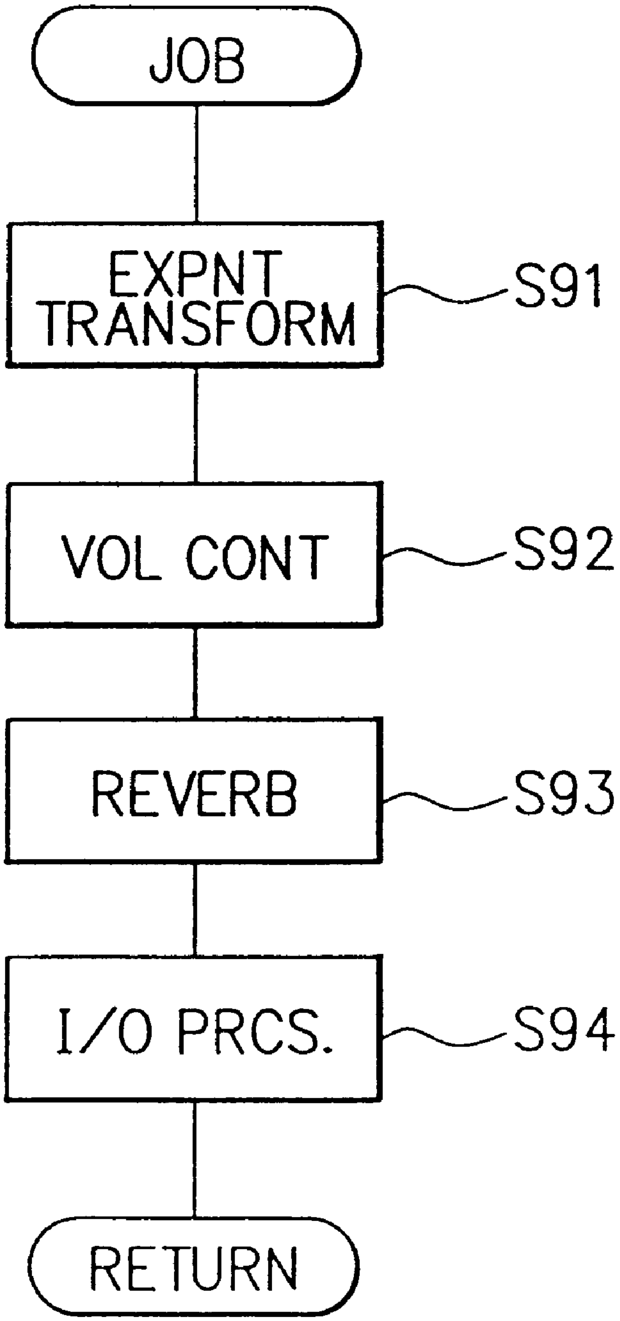
FIG. 5 is a flow chart showing the contents of the processing JOB.

In step S5, an interpolated value behind one sampling time is obtained by calculating the value given by "current data+variation D×Acc/N", and is newly set as the current data. After the counter value is incremented by 1 in step S6, the flow advances to step S9 to execute various kinds of arithmetic processing JOB. The arithmetic processing includes as shown in FIG. 5, step S91 of obtaining exponentially transformed EXP data by exponentially transforming the interpolated value (current data) obtained in step S5, as will be described later, volume control step S92 of multiplying tone data input from the tone generator 10 by the exponentially transformed EXP data, reverberation addition step S93 of adding a reverberation tone to the volume-controlled tone data, step S94 of inputting/outputting from/to tone data to the DSP 1, and the like. Since these processing steps are executed in turn, reverberation processing is done after the volume control; the reverberation tone is never influenced by the volume control.

After the processing for one sampling is complete in step S10, the flow returns to step S4 to check if the counter value has reached N, and the processing in step S4→S5→S6→S9→S10 is repeated until the counter value reaches N. When the counter value has reached N, the flow advances to step S7 to reset the counter value to zero. After that, the EXP data value at that time is used as new data to calculate the value given by "new data-current data", and the obtained value is set as a new variation D, in step S8.

After the processing in step S8, the processing in steps S9 and S10 is executed, and the flow then returns to step S4. As described above, EXP data is resampled at N sampling periods by a loop including steps S7 and S8, and the sampled data are linearly interpolated to connect the sampled sampling points by a loop including steps S5 and S6.

The exponential transformation done by the exponential transformer 6 shown in FIG. 1 will be explained below. Normally, in an electronic musical instrument, the volume to be controlled by the EXP data has linear characteristics. Such characteristics are used when the volume control is made using not only the EXP pedal 7 but also, e.g., an external MIDI signal or sequence data. Since these data preferably have equal characteristics, linear characteristics are used in correspondence with those of the MIDI signal or sequencer data.

Figure 6A:
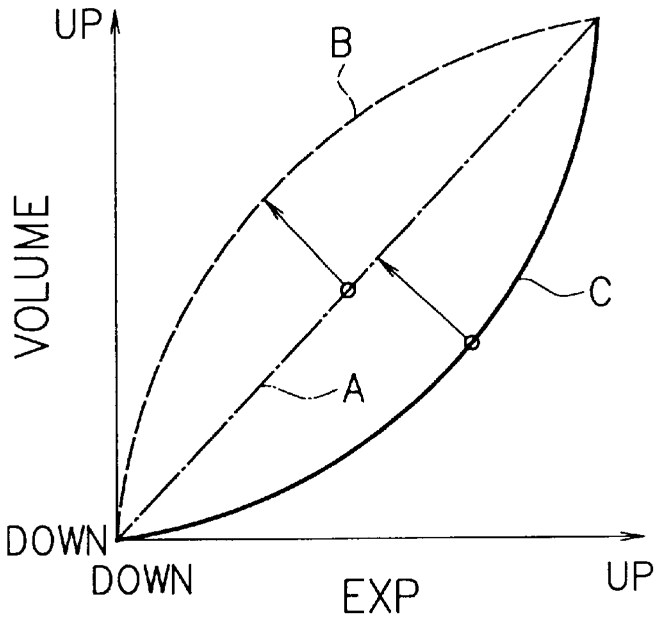
FIGS. 6A and 6B are graphs for explaining the exponential transformation of the embodiment shown in FIG. 1.
Figure 6B:
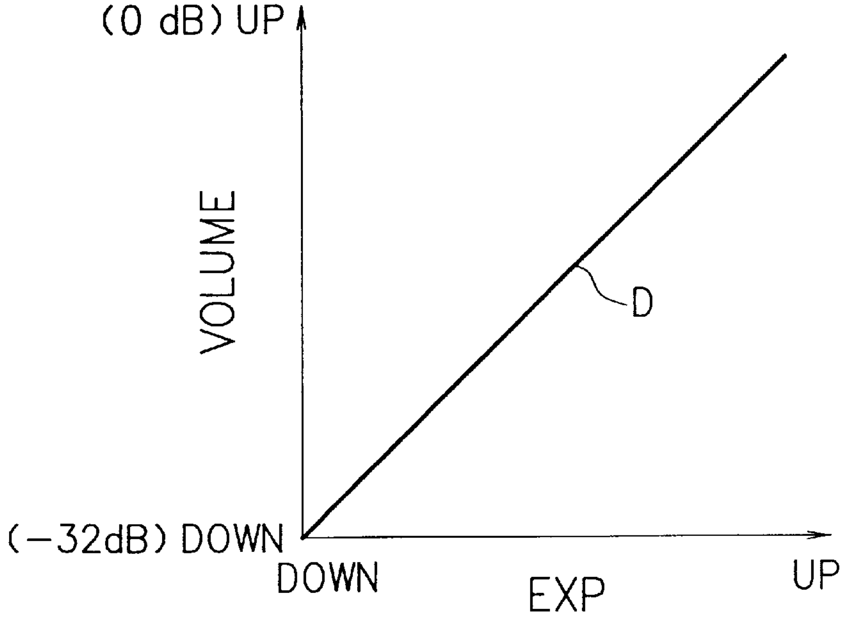

However, even when the EXP data itself interpolated by the interpolator 5 has linear characteristics A, as shown in FIG. 6A, they become characteristics B auditory sense of a human being, and does not sound linearly. For this reason, in this embodiment, the exponential transformer means 6 is inserted at the output side of the interpolator 5 to obtain a characteristic curve C by exponentially transforming the linear characteristic curve A, so that the obtained characteristics sound linear in the auditory sense of a human being (in dB on logarithmic axis) like characteristics D shown in FIG. 6B.

If X represents the interpolated data input to the exponential transformer 6 to obtain 0 dB when X assumes a maximum value and −32 dB when X assumes a minimum value, output data Y of the exponential transformer 6 is given by:

$$Y=10\hat{\ }(32/20\times(X-1)) \qquad (1)$$

for maximum value of X=1, and minimum value=0.

Note that the arithmetic operation based on equation (1) above is actually made by the DSP 1 using approximation (2) below:

$$Y\approx aX+bX^2+cX^4+d \qquad (2)$$

for a=0.10413, b=0.13885 c=0.72891, d=0.02512

In practice, a tone signal output from the tone generator 10 is multiplied by the operation result Y based on relation (2) to attain volume control.

Figure 7:
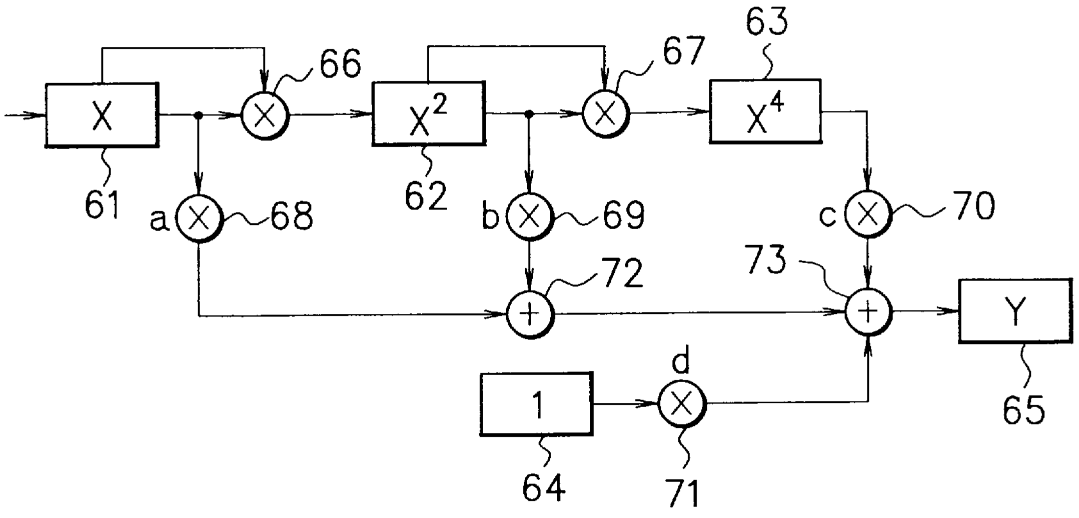
FIG. 7 is a block diagram showing the arrangement for performing exponential transformation of the embodiment shown in FIG. 1.

FIG. 7 is a block diagram showing the arrangement for calculating the approximation (2) above of the exponential transformation. In FIG. 7, reference numerals 61, 62, 63, 64, and 65 denote registers for respectively storing X, $X^2$, $X^4$, 1, and the exponentially transformed operation result Y. Reference numerals 66 to 71 denote multipliers; and 72 and 73, adders.

As has been described in detail above, according to this embodiment, the multiplier 4 that controls the volume based on EXP data is inserted before the reverberation device 2, so that the volume control using the EXP pedal 7 is done for only an original tone but not for a reverberation tone (the reverberation effect is added to the volume-controlled signal). For this reason, when accents of tones are controlled by the EXP pedal 7, a natural reverberation effect can always be obtained without influencing the attenuation characteristics of the reverberation tone added by the reverberation device 2.

Since the interpolator 5 for linearly interpolating EXP data upon making the volume control using the EXP pedal 7 for an original tone is arranged, noise can be prevented from being produced by abrupt changes in EXP data. At this time, when the coefficient ACC used for determining the linear interpolation target value is set at an appropriate value, both smooth changes in EXP data and good followability of EXP data for changes can be attained.

In the above embodiment, the interpolator 5 is used for smoothly changing the EXP data. In place of the interpolator 5, an LPF may be used or other smoothing circuits may be used. When the LPF is used, since it is simple, the number of steps of the program can be reduced, and no resampling is required, resulting in simple processing.

Figure 8:
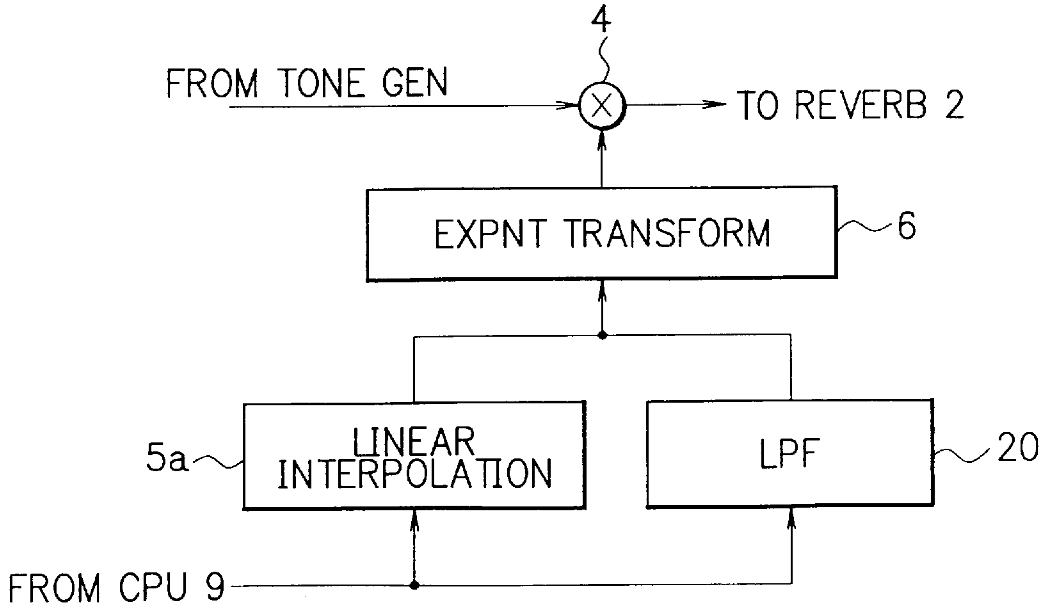
FIG. 8 is a functional block diagram showing a modification of the data processing in a DSP shown in FIG. 1.

However, since the response characteristics of the LPF are exponential, the LPF is often not suitable depending on cases of variation of EXP data. For example, when the EXP pedal 7 is operated no so frequently and the operation time interval is large, the volume abruptly and exponentially changes even when LPF processing is done at the time of the change in EXP data, resulting in generation of noise. In such case, linear interpolation is preferably used. Hence, as shown in FIG. 8, when linear interpolator 5*a* and interpolation by an LPF 20 are combined and are selectively used in correspondence with e.g. the use frequency of the EXP pedal 7 to utilize each other's merits, more delicate adjustment can be attained, and smoother interpolation with better followability can be realized. Such control is implemented by a program stored in a memory (not shown).

In the above embodiment, the volume control based on the operation of the EXP pedal has been explained. However, as described above, since a MIDI signal input from an external device via the MIDI terminal 13 and sequence pattern data from the sequencer 14 include data corresponding to the EXP data, the volume control based on these data is similarly made.

According to the present invention, as described above, since the volume control for controlling volume on the basis of EXP data is inserted before the effect addition, when, for example, accents of tones are controlled by the EXP pedal, a natural reverberation effect can always be obtained without influencing the attenuation characteristics of the reverberation tone added by the effect addition.

According to another feature of the present invention, since the smoother for smoothing variation points of EXP data which are input intermittently is arranged, noise arising from abrupt changes in EXP data can be effectively prevented.

According to still another feature of the present invention, since the smoother includes a circuit for resampling EXP data which are intermittently input at indefinite intervals, and a circuit for performing linear interpolation using the value of a predetermined ratio between the current and next sampling point values as a target value, smooth changes in EXP data and good followability of EXP data for changes can be achieved at the same time.

What is claimed is:

1. An electronic musical instrument comprising:

effect addition means for adding an acoustic effect to an input tone signal;

volume control means for controlling volume of the input tone signal on the basis of expression data, said volume control means being inserted before said effect addition means; and smoothing means for smoothing variation points of the expression data which are input intermittently.

2. The electronic musical instrument according to claim 1, wherein the expression data is operation amount data of an expression pedal.

3. The electronic musical instrument according to claim 1, wherein the expression data is data selected from a group consisting of data included in an externally input MIDI signal and a sequence pattern.

4. The electronic musical instrument according to claim 1, wherein said volume control means comprises a digital signal processor.

5. The electronic musical instrument according to claim 1, wherein said smoothing means comprises interpolation means for linearly interpolating the expression data.

6. The electronic musical instrument according to claim 5, wherein said interpolation means comprises:

resampling means for resampling the expression data, which are intermittently input at indefinite intervals, at given time intervals to obtain normalized expression data; and linear interpolation means for performing linear interpolation to a target value which is a value of a predetermined ratio between current and next sampling point values obtained by said resampling means.

7. The electronic musical instrument according to claim 1, wherein said smoothing means comprises a low pass filter.

8. The electronic musical instrument according to claim 1, wherein said smoothing means comprises:

interpolation means for linearly interpolating the expression data; and a filter for low-pass filtering the expression data, said smoothing means selectively processing the expression data with said interpolation means and said filter.

9. The electronic musical instrument according to claim 1, further comprising exponential transformation means for performing auditory sense correction for volume control by exponentially transforming the expression data smoothed by said smoothing means.

10. An electronic musical instrument comprising:

volume control means for controlling an accent of a tone by controlling an amplitude of tone data in accordance with expression data which changes along with the progress of a music piece;

reverberation means for adding a reverberation tone signal having predetermined attenuation characteristics to an output from said volume control means; and smoothing means for smoothing an abrupt change in the expression data.

11. The electronic musical instrument according to claim 10, wherein the expression data is data selected from a group consisting of expression data indicating an operation amount of an expression pedal, expression data included in MIDI data supplied to a communication port of the electronic musical instrument, and expression data in a pre-programmed tone data sequence held in the electronic musical instrument.

12. The electronic musical instrument according to claim 10, wherein said volume control means and said reverberation means are constituted by a digital signal processor, and a volume control program and reverberation addition program are executed in turn for single tone data.

13. The electronic musical instrument according to claim 10, further comprising exponential transformation means for performing auditory sense correction for volume control by exponentially transforming the expression data smoothed by said smoothing means.

14. The electronic musical instrument according to claim 10, wherein said smoothing means comprises interpolation means for linearly interpolating the expression data.

15. The electronic musical instrument according to claim 14, wherein said interpolation means comprises:

resampling means for resampling the expression data, which are intermittently input at indefinite intervals, at given time intervals to obtain normalized expression data; and linear interpolation means for performing linear interpolation to a target value which is a value of a predetermined ratio between current and next sampling point values obtained by said resampling means.

16. The electronic musical instrument according to claim 10, wherein said smoothing means comprises a low pass filter.

17. The electronic musical instrument according to claim 10, wherein said smoothing means comprises:

interpolation means for linearly interpolating the expression data; and a filter for low-pass filtering the expression data, said smoothing means selectively processing the expression data with said interpolation means and said filter.

18. A method of effect addition for an input tone signal comprising:

providing expression data intermittently;

smoothing variation points of the expression data;

adjusting volume of the input tone signal based on the smoothed expression data; and adding an acoustic effect to the volume adjusted expression data.

19. The method of effect addition of claim 18, wherein said step of smoothing comprises linearly interpolating the expression data.

20. The method of effect addition of claim 19, wherein said step of linearly interpolating comprises:

resampling the expression data at given time intervals to provide normalized data; and linearly interpolating the normalized data to a target value which is a value of a predetermined ratio between current and next sampling point values of said step of resampling.

21. The method of effect addition of claim 18, wherein said step of smoothing comprises selectively linearly interpolating and low-pass filtering the expression data.

22. The method of effect addition of claim 21, wherein the effect data is selectively linearly interpolated and low pass filtered based on frequency of the provided expression data.

23. The method of effect addition of claim 18, wherein said step of smoothing comprises low pass filtering the expression data.

24. The method of effect addition of claim 18, further comprising exponentially transforming the smoothed expression data to provide auditory sense correction for volume control.

25. The method of effect addition of claim 18, wherein said step of adding an acoustic effect comprises effecting reverberation.

26. The method of effect addition of claim 18, wherein said step of providing expression data comprises providing expression data indicative of an operation amount of a manual operation member.

27. The method of effect addition of claim 18, wherein said step of providing expression data comprises providing expression data included in MIDI data supplied to a communication port of a musical instrument.

28. The method of effect addition of claim 18, wherein said step of providing expression data comprises providing expression data from a stored pre-programmed tone data sequence.

* * * * *